US007682412B2

(12) United States Patent
Oh

(10) Patent No.: US 7,682,412 B2

(45) Date of Patent: Mar. 23, 2010

(54) MULTI-CYCLONE DUST COLLECTION APPARATUS

(75) Inventor: Jang-keun Oh, Gwangju (KR)

(73) Assignee: Samsung Gwanju Electronics Co., Ltd., Gwangju (KR)

( * ) Notice: Subject to any disclaimer, the term of this patent is extended or adjusted under 35 U.S.C. 154(b) by 913 days.

(21) Appl. No.: 11/408,772

(22) Filed: Apr. 21, 2006

(65) Prior Publication Data

US 2007/0079583 A1 Apr. 12, 2007

(30) Foreign Application Priority Data

Oct. 10, 2005 (KR) ..................... 10-2005-0095102

(51) Int. Cl.
*B01D 45/12* (2006.01)

(52) U.S. Cl. .......................... 55/345; 55/346; 55/459.1; 55/343; 55/348; 55/349; 55/DIG. 3; 15/353

(58) Field of Classification Search ................... 55/345, 55/346, 459.1, DIG. 3, 343, 348, 349; 15/353
See application file for complete search history.

(56) References Cited

U.S. PATENT DOCUMENTS

| | | | | |
|---|---|---|---|---|
| 6,428,589 | B1 | 8/2002 | Bair et al. | 55/318 |
| 6,482,252 | B1 * | 11/2002 | Conrad et al. | 96/57 |
| 6,732,406 | B2 * | 5/2004 | Oh | 15/352 |
| 7,297,172 | B2 * | 11/2007 | Lee | 55/337 |
| 7,547,351 | B2 * | 6/2009 | Oh et al. | 95/271 |
| 2005/0252180 | A1 * | 11/2005 | Oh et al. | 55/345 |
| 2007/0079585 | A1 * | 4/2007 | Oh et al. | 55/345 |
| 2007/0079587 | A1 * | 4/2007 | Kim | 55/349 |
| 2007/0095029 | A1 * | 5/2007 | Min et al. | 55/345 |

FOREIGN PATENT DOCUMENTS

| | | |
|---|---|---|
| FR | 2619498 | 2/1989 |
| FR | 2865917 | 8/2005 |
| GB | 2360719 | 10/2001 |
| KR | 1020030062520 | 7/2003 |
| WO | WO02/067755 | 9/2002 |
| WO | WO/02067756 | 9/2002 |

OTHER PUBLICATIONS

European Search Report dated Mar. 20, 2008 based on EP application No. EP06290872.

* cited by examiner

*Primary Examiner*—Jason M Greene
*Assistant Examiner*—Dung Bui
(74) *Attorney, Agent, or Firm*—Ohlandt, Greeley, Ruggiero & Perle, L.L.P.

(57) ABSTRACT

A multi-cyclone dust collection apparatus is disclosed that comprises a first cyclone having an air inlet, in which the air introduced into the first cyclone through the air inlet is caused to swirl and ascend in the first cyclone so that dust is separated from the air; and a plurality of second cyclones arranged around the lower part of the first cyclone, in which the air discharged from the first cyclone into the second cyclones is further caused to swirl and ascend so that dust is separated from the air. Each of the second cyclones is provided with an air outlet through which the purified air is discharged. The air inflow port is provided at the bottom of the first cyclone and the outflow ports are provided at the lower ends of the second cyclones.

11 Claims, 5 Drawing Sheets

MULTI-CYCLONE DUST COLLECTION APPARATUS

CROSS-REFERENCE TO RELATED APPLICATIONS

This application claims the benefit of Korean Patent Application No. 2005-95102 filed on Oct. 10, 2005 with the Korean Intellectual Property Office, the disclosure of which is incorporated herein by reference.

BACKGROUND OF THE INVENTION

1. Field of the Invention

The present invention relates to a vacuum cleaner, and in particular, to a multi-cyclone dust collection apparatus, which is employed in a vacuum cleaner so as to filter dirt suctioned from a surface to be cleaned together with air, using centrifugal force over two or more steps.

2. Description of the Related Art

In general, a cyclone vacuum cleaner comprises a bottom brush for suctioning dirt from a surface to be cleaned together with air, a motor driving chamber provided with a driving source, and a vacuum cleaner body provided with a cyclone collection apparatus.

The cyclone collection apparatus is constructed in such a way that dust-entrained air, which is introduced from the bottom brush, is caused to form a swirling air stream so that dirt is separated from the air by centrifugal force, the dirt is collected, and clean air is discharged into the motor driving chamber. In recent years, in order to improve the dust collection efficiency, there has been proposed a multi-cyclone dust collection apparatus that separates dust entrained in air over two or more steps, wherein such a multi-cyclone dust collection apparatus comprises one or more secondary cyclones.

The above-mentioned types of conventional multi-cyclone dust collection apparatuses are disclosed in WO02/067755 and WO02/067756 (by Dyson Ltd.). However, such conventional multi-clone dust collection apparatuses are mainly applied to an upright type cleaner but hard to be applied to a canister-type cleaner because an upstream cyclone (a first cyclone) and a downstream cyclone (a second cyclone) are vertically arranged, thereby increasing the entire height of the dust-collection apparatus.

In order to solve the above problems, Korean Patent Application No. 2003-62520 discloses a multi-cyclone dust collection apparatus in which second cyclones are arranged around a first cyclone. However, efforts for reducing heights of dust collection apparatus have been continued so as to miniaturize cleaners. In addition, such a dust collection apparatus is configured in such a manner that ambient air is introduced into an upper part of the first cyclone and discharged through upper parts of the second cyclones. Thus, even in an upright type cleaner, an airflow path from the bottom brush of the cleaner to the air inlet of the first cyclone of the cyclone dust collection apparatus, and an airflow path from the air outlet of the second cyclone to the motor driving chamber provided at the bottom part of the cleaner are too long. As a result, there is a problem in that the loss in suction force in the piping of the cleaner is too high.

SUMMARY OF THE INVENTION

Accordingly, the present invention has been made to solve the above-mentioned problems occurring in the prior art, and an object of the present invention is to provide a multi-cyclone dust collection apparatus, capable of reducing the lengths of a flow path for air introduced from a bottom brush to the multi-cyclone dust collection apparatus and a flow path for air discharged from the cyclone dust collection apparatus to a motor driving chamber, thereby reducing the loss in suction force.

Another object of the invention is to provide a multi-cyclone dust collection apparatus, the overall height of which is reduced so that the multi-cyclone dust collection apparatus can be easily applied to a compact-size cleaner such as a canister-type cleaner as well as an upright type cleaner.

In order to achieve the above-mentioned objects, there is provided a multi-cyclone dust collection apparatus comprising: a multi-cyclone body having an air inflow port provided at the bottom of the multi-cyclone body so as to allow ambient air flow into the multi-cyclone body, a first cyclone body communicated with the air inflow port, and a second cyclone body provided with a plurality of second cyclones arranged around the first cyclone body, a sealing cover joined to the top end of the multi-cyclone body so as to close the multi-cyclone body; an inflow/outflow guide cover joined to the bottom of the multi-cyclone body, the first cyclone body and the plurality of second cyclones being communicated with each other by the inflow/outflow guide cover; and a discharge cover jointed to the lower end of the inflow/outflow guide cover so as to collect the air discharged from the plurality of second cyclones through the inflow/outflow guide cover and then so as to discharge the collected air to the outside of the multi-cyclone dust collection apparatus.

The first cyclone body is preferably formed with an air outlet at the lower end thereof and the air discharged from the air outlet is preferably introduced into the second cyclones through the lower ends of the second cyclones. As a result, it is possible to reduce the height of the dust collection apparatus. In addition, because air is introduced into the dust collection apparatus through the bottom side thereof and discharged from the dust collection apparatus through the bottom side thereof, the flow paths to the bottom brush and the motor driving chamber can be reduced, whereby the loss in suction force caused by the piping of the dust collection apparatus can be reduced.

The first cyclone body may comprise a first chamber outer wall defining a first cyclone chamber which causes the dirt-containing air introduced from the air inflow port to form additional swirling air streams, each of the plurality of second cyclones may comprise a second chamber outer wall defining a second cyclone chamber, which causes the dirt-containing air introduced from the first cyclone body to form swirling air stream, and the central axis of the swirling air stream formed in the first cyclone chamber may not be parallel to the central axis of the swirling air stream formed in each of the second cyclone chambers.

In addition, each of the second cyclones may be formed in such a way that the central axis of the swirling air stream in each of the second cyclone chambers is more spaced away from the central axis of the swirling air stream formed in the first cyclone chamber as approaching the top end of the second cyclone.

The multi-cyclone body may further comprise a dirt collecting chamber formed between the first chamber outer wall and the outer wall of the multi-cyclone body, and the dirt collecting chamber may be divided by a separating partition into a first dirt collecting chamber for collecting relatively coarse dirt separated from the air in the first cyclone body and a second dirt collecting chamber for collecting relatively fine dirt separated from the air in the plurality of second cyclones.

Here, the sealing cover may be detachably joined to the top end of the multi-cyclone body, thereby cooperating with the first chamber outer wall so as to form a dirt outlet for discharging the dirt separated from the air in the first cyclone chamber into the first dirt collecting chamber, and a knob is provided on the top of the sealing cover.

In addition, the sealing cover may further comprise a backflow prevention member, which is extended from the bottom of the sealing cover and inserted into the multi-cyclone body so as to prevent the dirt collected in the first dirt collecting chamber from flowing backward to the first cyclone chamber.

The first cyclone body may further comprise: a helical guide member for guiding the air introduced through the air inflow port so that the air forms an ascending air stream in the first cyclone chamber; and an air discharging pipe mounted vertically from the lower end of the first chamber outer wall in such a manner as to be communicated with the air outlet, the air discharging pipe guiding the ascending air stream formed in the first cyclone chamber to the air outlet.

According to another aspect of the present invention, there is provided a multi-cyclone dust collection apparatus comprising: a first cyclone having an inlet through which ambient air is introduced into the first cyclone, in which the air introduced into the first cyclone is caused to swirl and ascend in the first cyclone so that dust is separated from the air; and a plurality of second cyclones arranged around the lower part of the first cyclone, in which the air discharged from the first cyclone into the plurality of second cyclones is further caused to swirl and ascend so that dust is separated from the air, each of the plurality of second cyclones having an outlet through which the purified air is discharged from the plurality of second cyclones. The inlet is provided at the bottom of the first cyclone and the air outlets are provided at the lower ends of the plurality of second cyclones so that ambient air is introduced into the first cyclone through the bottom of the first cyclone and then the purified air is discharged from the second cyclones through the lower ends of the second cyclones.

Here, it is preferable that a dirt collecting chamber may be formed between the first cyclone and the second cyclones, and it is more preferable that the body of the first cyclone body and the body of the second cyclones are integrally injection-molded.

BRIEF DESCRIPTION OF THE DRAWINGS

The above aspects and features of the present invention will be more apparent from the description for certain embodiments of the present invention taken with reference to the accompanying drawings, in which.

DETAILED DESCRIPTION OF THE PREFERRED EMBODIMENTS

Figure 1:
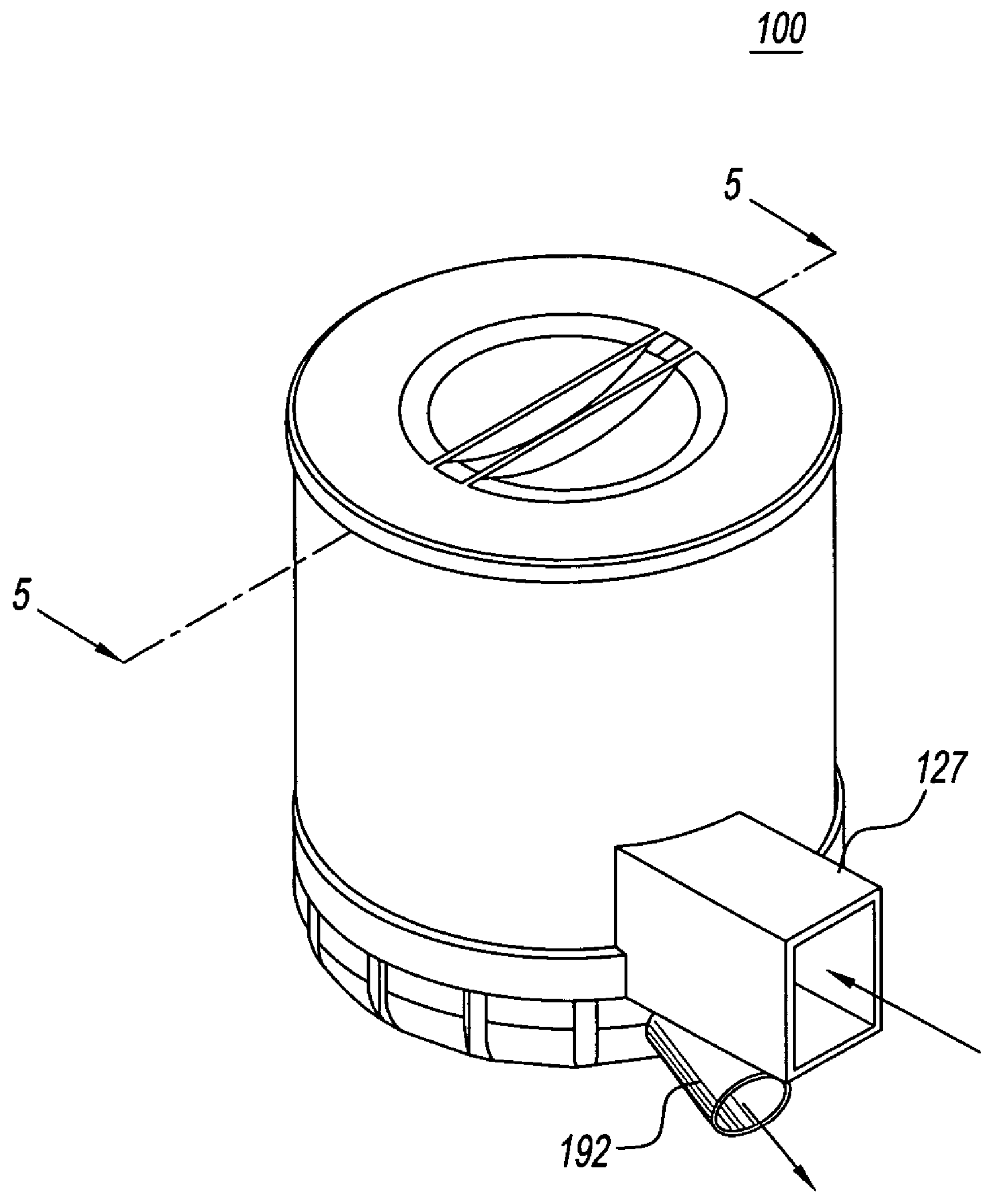
FIG. 1 is a perspective view of a multi-cyclone dust collection apparatus according to an embodiment of the invention.

Hereinbelow, the preferred embodiments of the present invention are described in detail with reference to accompanying drawings. In the following description, a detailed description of known functions and configurations incorporated herein will be omitted when it may make the subject matter of the present invention rather unclear.

Referring to FIGS. 1 through 6, a multi-cyclone dust collection apparatus 100 comprises a first cyclone having a first cyclone body 120, an air inflow port 127 defining an inlet 127', and an air outlet 124, and second cyclones respectively having an air inlet 141, a second cyclone body 130 and discharge guide flow paths 182 which serve as outlets. Since each of the second cyclones is formed in a cone shape, they will be hereinafter referred to as a "second cyclone".

As shown in the drawings, the inlet 127' is formed at the lower part of the first cyclone and the discharge guide flow paths 182 serving as outlets, are formed at the lower parts of the second cyclones. Therefore, referring to FIG. 1, ambient air is introduced into the multi-cyclone dust collection apparatus 100 through the air inflow port 127 and the clean air, from which dirt has been removed over two steps, is discharged to the outside of the multi-cyclone dust collection apparatus 100 through an air outflow port 192 via the discharge guide flow paths 182 (see FIG. 5). Accordingly, as shown in FIG. 6, the length of a first flow path 230 for drawing in the air from a bottom brush 220 and the length of a second flow path 240 for discharging the air to a motor driving chamber (not shown) with a vacuum source installed therein are reduced, thereby reducing the loss in a suction force.

Figure 2:
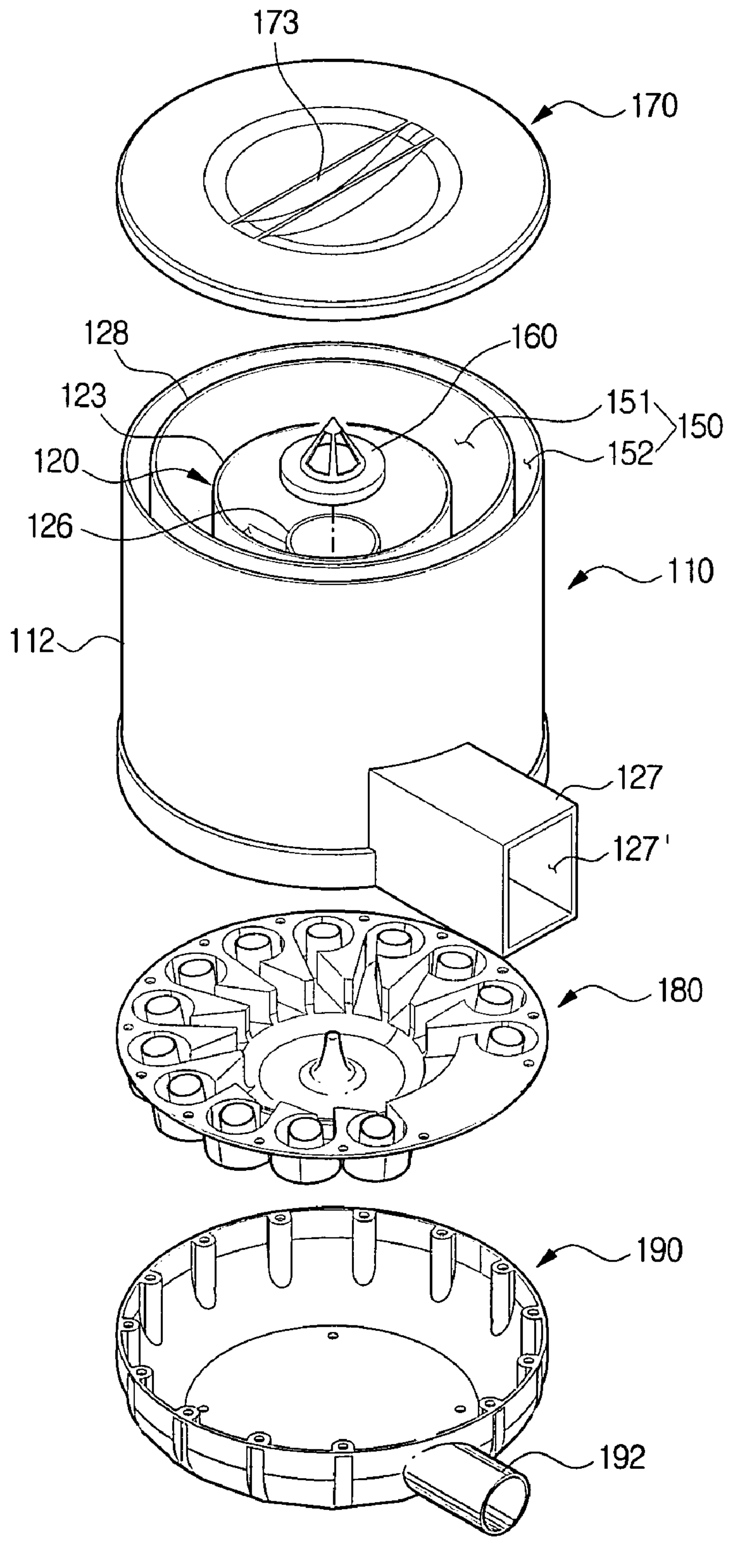
FIG. 2 is an exploded perspective view of the multi-cyclone dust collection apparatus shown in FIG. 1.

Referring to FIG. 2, the multi-cyclone dust collection apparatus comprises a multi-cyclone body 110, a sealing cover 170, an inflow/outflow guide cover 180, and a discharge cover 190.

The multi-cyclone body 110 forms a swirling air stream from the dirt-containing air introduced from the outside, and filters off the dirt from the air over two steps. Preferably, the multi-cyclone body 110 is integrally injection-molded, so that the multi-cyclone body 110 can be manufactured in a compact-sized configuration and the number of steps for assembling the multi-cyclone body 110 can be reduced. The outer wall 112 of the multi-cyclone body 110 has, at the lower side thereof, the air inflow port 127 for drawing in ambient air into the multi-cyclone body. The air inflow port 127 extends to a first chamber outer wall 123 through the outer wall 112 of the multi-cyclone body 110. The multi-cyclone body 110 comprises a first cyclone body 120 and a second cyclone body 130.

Figure 5:
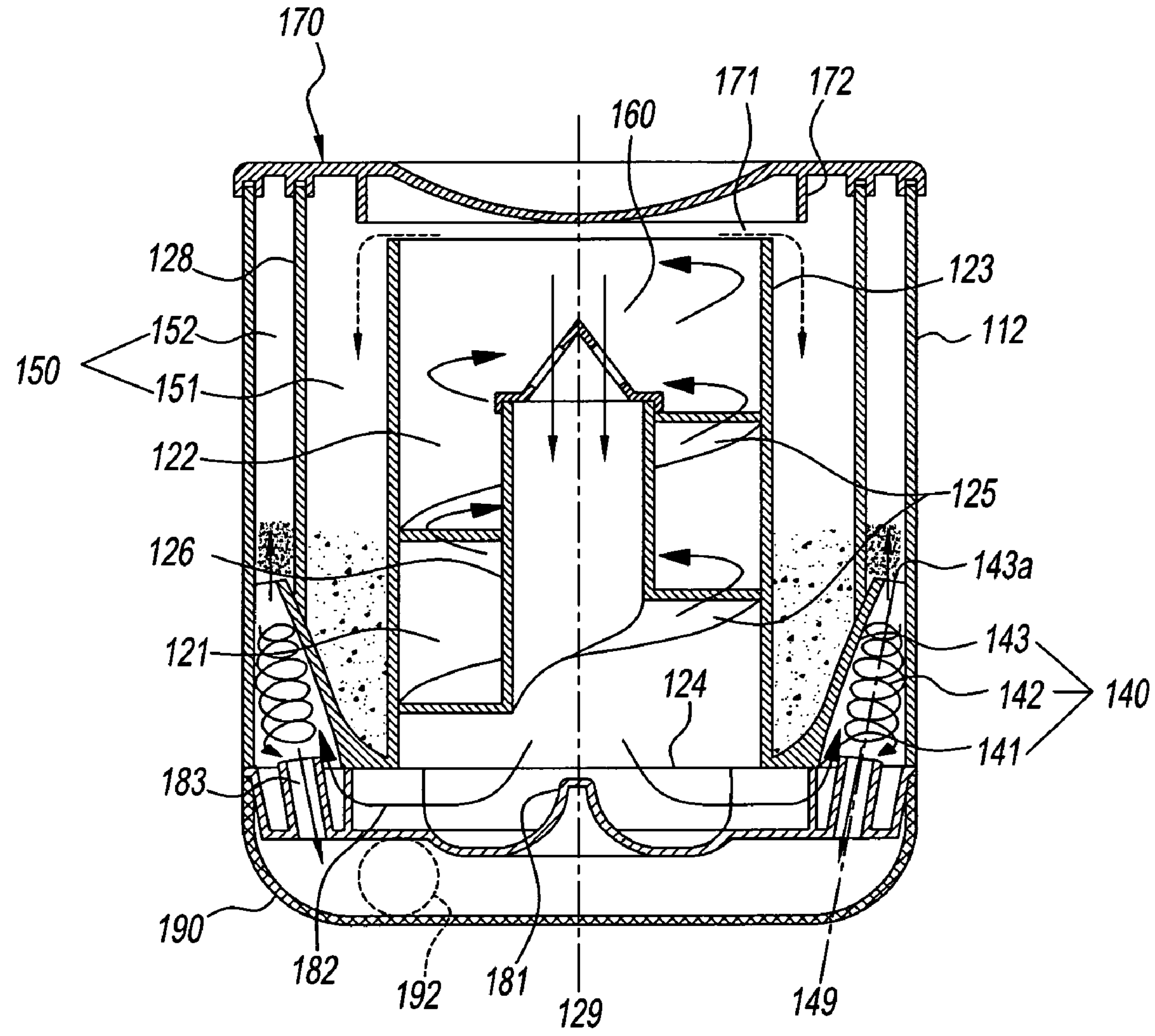
FIG. 5 is a sectional view taken along a line 5-5 of FIG. 1.
Figure 6:
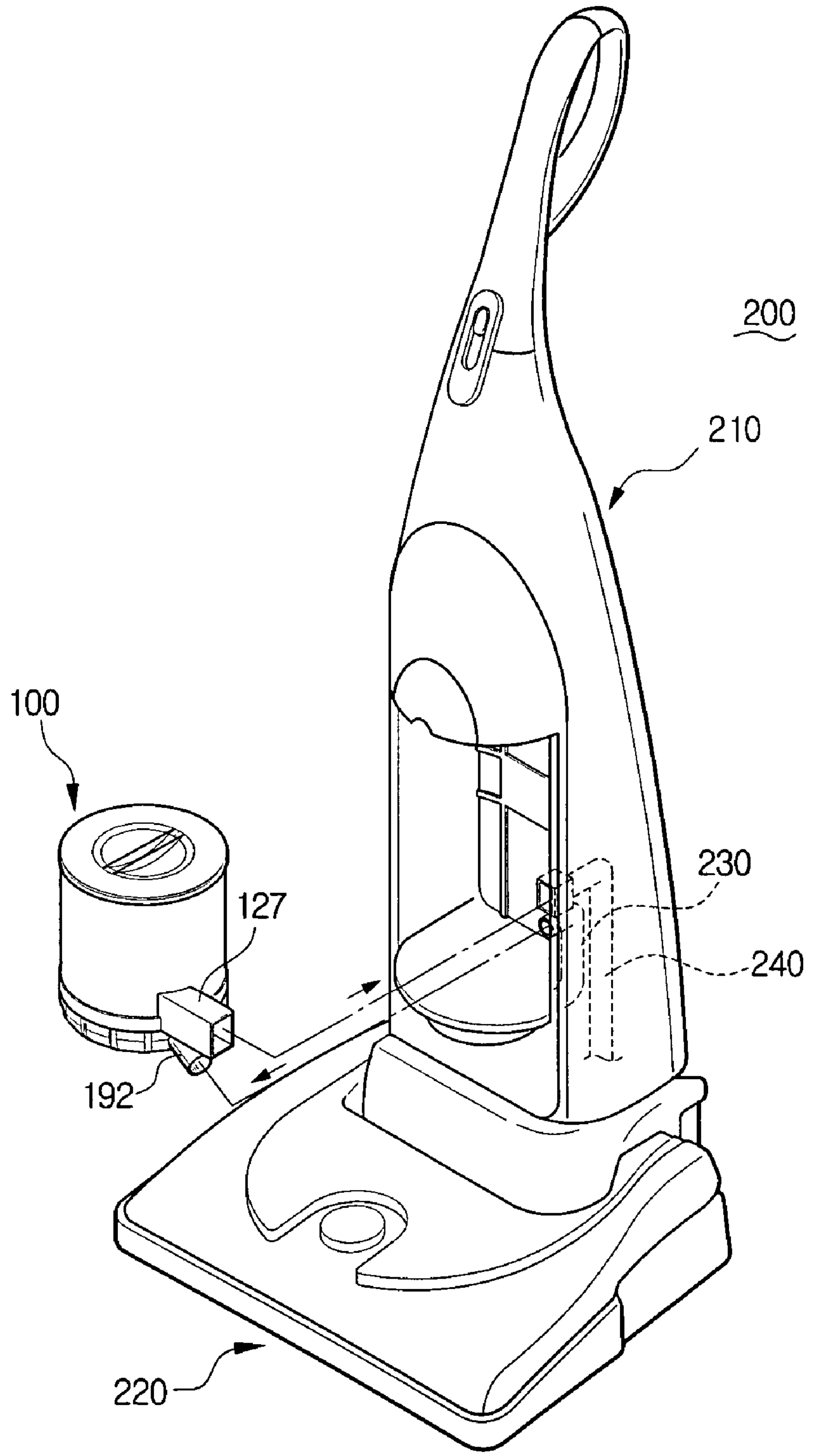
FIG. 6 is a schematic perspective view of an upright type vacuum cleaner, to which a multi-cyclone dust collection apparatus according to an embodiment of the invention is employed.

Referring to FIGS. 2 and 5, the first cyclone body 120 comprises the first chamber outer wall 123 defining a first cyclone chamber 122, a first air inlet 121, and an air outlet 124. In the first cyclone chamber 122, the dirt-containing air introduced through the air inflow port 127 is caused to form a swirling air stream so that relatively coarse dirt can be separated from the air. The first air inlet 121 is communicated with the air inflow port 127, thereby allowing the air introduced through the air inflow port 127 to flow into the first cyclone chamber 122. The air outlet 124 is formed at the lower end of the first cyclone chamber 122, through which the dirt removed air is discharged.

An air discharging pipe 126 with a predetermined vertical height is provided at the center of the first cyclone chamber 122 so that the air discharge pipe 126 communicates with the air outlet 124. The air ascending from the first cyclone chamber 122 descends through the air discharging pipe 126 and flows out of the air discharging pipe 126 through the air outlet 124. Between the outer wall of the air discharging pipe 126 and the inner surface of the first chamber outer wall 123, guide members 125 are successively provided to be upwardly inclined in a helical shape. The air introduced through the first air inlet 127 swirls while forming the ascending air stream due to the guide members 125 in the first cyclone chamber 122. A grill member 160 is mounted on the top end of the air discharging pipe 125 so that the dirt separated from the air cannot flow out through the air discharging pipe 125.

A dirt collecting chamber 150 is formed between the first chamber outer wall 123 and the outer wall 112 of the multi-cyclone body 110. The dirt collecting chamber 150 comprises a first dirt collecting chamber 151 for collecting relatively coarse dirt filtered in the first cyclone body 120 and a second dirt collecting chamber 152 for collecting relatively fine dirt filtered in the second cyclone body 130. The first dirt collecting chamber 151 and the second dirt collecting chamber 152 are defined by a separating partition 128.

Because the dirt collecting chamber 150 is secured between the first cyclone body 120 and the second cyclone body 130, it is not necessary to provide a dedicated dirt collecting receptacle. Accordingly, it is possible to reduce the overall height of the multi-cyclone dust collection apparatus 100 so that the multi-cyclone dust collection apparatus can be applied to a variety of cleaners.

Figure 3:
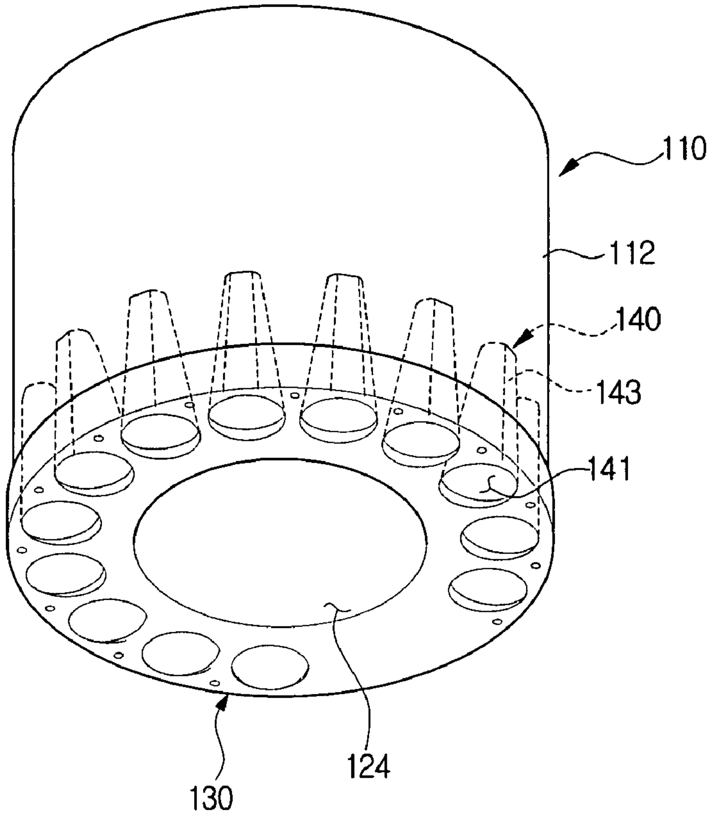
FIG. 3 is a bottom-side perspective view of a multi-cyclone body of FIG. 2.

Referring to FIGS. 3 and 5, the second cyclone body 130 comprises a plurality of second cyclones 140. The plurality of second cyclones 140 secondarily filter the fine dirt contained in the air introduced from the first cyclone body 120. The plurality of second cyclones 140 are arranged around the first cyclone body 120 at a predetermined interval to be approximately parallel to each other. It is preferred that the second cyclones 140 are substantially same with each other in size and shape.

According to the present invention, because the first cyclone body 120 has a downward discharge structure, i.e., because the first cyclone body 120 is provided with the air outlet 124 at the lower end thereof, the plurality of second cyclones 140 also are configured in such a way that air is introduced from the lower ends thereof, thereby reducing the length of the airflow path. For this purpose, each of the second cyclones 140 is configured in a conical shape, i.e., a shape whose diameter is reduced as approaching the top end thereof. Therefore, the second cyclones 140 will be referred to as cyclone cones 140 hereinafter.

Each of the cyclone cones 140 comprises a second air inlet 141 and a second chamber outer wall 143 defining a cyclone cone chamber 142. The second air inlet 141 is communicated with the air outlet 124 of the first cyclone body 120 through the inflow guide flow path 182 of the inflow/outflow guide cover 180 (see FIG. 6). The cyclone cone chamber 142 allows the air introduced through the second air inlet 141 to form additional swirling streams so that fine dirt can be separated from the air.

As shown in the drawing, the second chamber outer wall 143 of each of the cyclone cones 140 is inclined toward the outer wall 112 of the multi-cyclone body 110 as approaching the top end 143*a* thereof. That is, the central axis 149 of the swirling air stream in each of the cyclone cone chambers 142 is not parallel to the central axis 129 of the swirling air stream in the first cyclone chamber 122. The fine dirt separated from the air in each of the cyclone cone chambers 142 of the cyclone cones 140 is discharged to the second dirt collecting chamber 152. When each of the second chamber outer walls 143 is slanted, it is difficult for dirt to enter the cyclone cone chambers 142 again after being centrifugally separated from the air in the cyclone cone chambers 142 and discharged from the cyclone cone chambers 142. Consequently, the dirt can be easily removed and discharged.

In addition, since relatively coarse and heavy dirt is filtered off in the first cyclone chamber 122 and relatively fine dirt is filtered off in the cyclone cone chambers 142, it is desired to design the first dirt collecting chamber 151 to be larger than the second dirt collecting chamber 152 in volume. Accordingly, it is preferred that the central axis 149 of the swirling air stream in each of the cyclone cone chambers 142 is inclined away from the central axis 129 of the swirling air stream of the first cyclone chamber 122 as approaching the top end 143*a* of the corresponding second chamber outer wall 143.

Referring to FIGS. 2 and 5, the sealing cover 170 is joined to the top end of the multi-cyclone body 110 so as to close the inside of the multi-cyclone body 110. Meanwhile, the sealing cover 170 forms a dirt outlet 171 together with the top end of the first chamber outer wall 123 when it is joined to the top end of the multi-cyclone body 110. The dirt separated from the air in the first cyclone chamber 122 is accumulated in the first dirt collecting chamber 151 through the dirt outlet 171. A backflow prevention member 172 is provided on the inner surface or bottom surface of the sealing cover 170 for preventing the dirt accumulated in the first dirt collecting chamber 151 from flowing back to the first cyclone chamber 122. The backflow prevention member 172 is extended into the multi-cyclone body 110 when the sealing cover 170 is joined to the top end of the multi-cyclone body 110, in which the diameter of the backflow prevention member 172 is larger than that of the first chamber outer wall 123.

Meanwhile, the sealing cover 170 is detachably joined to the top end of the multi-cyclone body 110, and an upper surface of the sealing cover 170 is provided with a knob 173, as shown in FIG. 2. Accordingly, in order to empty the dirt from the dirt collecting chamber 150 after cleaning, a user may grasp the knob 173 with one hand to open the sealing cover 170, while holding the multi-cyclone body 110 with the other hand, and then empty the collected dirt from the dirt collecting chamber 150 by inverting the multi-cyclone body so that the dirt exits through the top end of the multi-cyclone body 110. Therefore, the dust emptying work can be easily performed, thereby improving the user's convenience.

Figure 4:
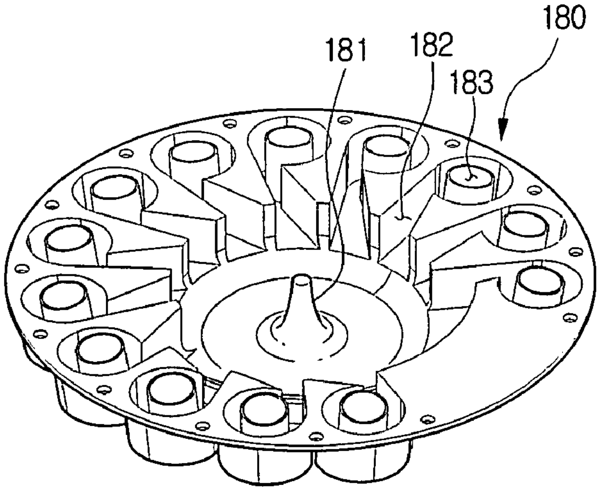
FIG. 4 is an enlarged perspective view of an inflow/outflow guide cover of FIG. 2.

Referring to FIGS. 4 and 5, the inflow/outflow guide cover 180 is joined to the lower end of the multi-cyclone body 110 and comprises a guide cone 181, inflow guide flow paths 182 and discharge guide flow paths 183. The guide cone 181 guides the air discharged from the air outlet 124 of the first cyclone body 120, so that the air is radially spread. The inflow guide flow paths 182 guide so that the radially spread air is forcibly introduced into each of the cyclone cones 140. Each of the inflow guide flow paths 182 has a predetermined width and depth and has a helical shape as approaching a corresponding cyclone cone 140. The discharge guide flow paths 183 guide the air separated from the dirt in the cyclone cone chambers 142 so that the air is discharged to the outside of the cyclone cone chambers 142. When the inflow/outflow guide cover 180 is joined, each of the discharge guide flow paths 183 with a circular pipe shape is extended into a corresponding cyclone cone chamber 142 to a certain depth so that the air discharged through the discharge guide flow paths 183 is not mixed with the air introduced through the second air inlets 141.

Referring back to FIG. 2, the discharge cover 190 is joined to the bottom part of the inflow/outflow guide cover 180. The discharge cover 190 has predetermined height for defining a space therein, wherein the discharge cover 190 is provided with an air outflow port 192 at a side thereof. The present invention is not limited to the position of the air outflow port 192. That is, the air outflow port 192 may be provided at the central of the bottom part of the discharge cover 190. The air discharged from the cyclone cones 140 through the discharge guide flow paths 183 is collected in the discharge cover 190 and then discharged to the outside of the multi-cyclone dust collection apparatus 100 through the air outflow port 192.

Although it has been exemplified that the inflow/outflow guide cover 180 and the discharge cover 190 are separated from each other in the above-mentioned embodiment of the invention, it should be noted that the invention is not limited thereto. That is, the inflow/outflow guide cover 180 and the discharge cover 190 may be integrally formed.

Hereinafter, the operation of the multi-cyclone dust collection apparatus having the above-mentioned structure will be described with reference to FIG. 5.

The dirt-containing air introduced via the air inflow port 127 (see FIG. 2) flows in the first cyclone chamber 122 through the first air inlet 121. The introduced air is guided by the guide member 125, thereby forming the swirling air stream while ascending in the first cyclone chamber 122. At this time, relatively coarse dirt contained in the air is concentrated toward the first chamber outer wall 123 due to the centrifugal force and is accumulated in the first dirt collecting chamber 151 through the dirt outlet 171 while flowing upward with the ascending air stream. The ascending air stream collides with the sealing cover 170, thereby being diverted to a descending air stream which passes the grill member 160 and flows into the air discharging pipe 126.

The air introduced into the air discharging pipe 126 flows out of the air outlet 124, and radially spreads due to the guide cone 181. Then, the air is guided by the inflow guide flow paths 182 so that the air flows into the cyclone cones 140. The air flowing in the cyclone cones 140 forms a swirling air stream while ascending in the cyclone cone chambers 142. At this time, fine dirt contained in the air is concentrated toward the second chamber outer walls 143 and flows out of the cyclone cone chamber 142 while flowing upward along with the ascending air stream. Accordingly, the fine dirt is accumulated in the second dirt collecting chamber 152. The air again descends again after the fine dirt is removed and then the air is discharged through the discharge guide flow paths 183. The air discharged through the discharge guide flow paths 183 is collected in the discharge cover 190 and flows out of the multi-cyclone dust collection apparatus 100 through the air outflow port 192.

In this manner, the multi-cyclone dust collection apparatus 100 according to the embodiment of the invention is generally configured in such a way that ambient air flows into the multi-cyclone dust collection apparatus 100 through the lower part thereof and flows out of the multi-cyclone dust collection apparatus 100 through the lower part thereof. In addition, because the air inlet and outlet are formed at the lower end of the first cyclone body 120 and air inflow/outflow paths are formed at the lower part of the multi-cyclone dust collection apparatus 100, the sealing cover 170 is provided at the upper part of the multi-cyclone dust collection apparatus 100, so that the collected dirt can be easily emptied from the multi-cyclone dust collection apparatus 100 only by opening the sealing cover 170.

Referring to FIG. 6, an upright type vacuum cleaner 200, which employs the inventive multi-cyclone dust collection apparatus 100, comprises a vacuum cleaner body 210 and a bottom brush 220. A motor driving chamber (not shown) is provided within the lower part of the vacuum cleaner body 210 and the multi-cyclone dust collection apparatus 100 is mounted on the top of the motor driving chamber. The air inflow port 127 of the multi-cyclone dust collection apparatus 100 communicates with the bottom brush 220 through a first flow path 230 and the air outflow port 192 communicates with the motor driving chamber through a second flow path 240. When suction force of a driving source generated from the motor driving chamber is applied, air containing dirt is introduced from a surface to be cleaned into the multi-cyclone dust collection apparatus 100 and the air is discharged to the outside of the vacuum cleaner body 210 via the motor driving chamber after being cleaned as the dirt is removed in the multi-cyclone dust collection apparatus 100.

As described above, because the air inflow port 127 and the air outflow port 192 are formed at the lower part of the multi-cyclone dust collection apparatus 100 according to the embodiment of the invention, the lengths of the first flow path 230 and the second flow path 240 are relatively reduced, as compared to those of a conventional vacuum cleaner, which employs a conventional multi-cyclone dust collection apparatus. Because the lengths of the first flow path 230 and the second flow path 240 are relatively reduced, the loss in suction force generated in the driving source can be reduced. In addition, the internal construction of the vacuum cleaner body 100 can be simplified.

As described above, according to the inventive multi-cyclone dust collection apparatus, air inflow/outflow paths are provided in the lower part of the multi-cyclone dust collection apparatus. As a result, of airflow paths communicating the motor driving chamber, the bottom brush and the air inlet/outlet ports of the multi-cyclone dust collection apparatus can be shortened, thereby reducing the loss in suction force generated from the motor driving chamber.

In addition, it is possible to make the multi-cyclone dust collection apparatus more compact by integrally injection-molding the first cyclone body and the cyclone cone body. Because a dirt collecting chamber is secured between the first cyclone body and the cyclone cone body, it is not necessary to provide a separate dirt collecting receptacle. Accordingly, it is possible to reduce the overall height of the multi-cyclone dust collection apparatus, so that the multi-cyclone dust collection apparatus can be applied to various cleaners.

In addition, because the cyclone cones are arranged to be inclined toward the cyclone body, the convenience in collecting and discharge dust can be enhanced.

Furthermore, because only the removal of the sealing cover is needed so as to empty collected dust from the multi-cyclone dust collection apparatus, the user's convenience is improved.

Although representative embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A multi-cyclone dust collection apparatus comprising:

a multi-cyclone body having an air inflow port provided at the lower part of the multi-cyclone body so as to allow ambient air flow into the multi-cyclone body, a first cyclone body communicated with the air inflow port, and a second cyclone body provided with a plurality of second cyclones arranged around the first cyclone body;

a sealing cover joined to the top end of the cyclone body so as to close the multi-cyclone body;

an inflow/outflow guide cover joined to the bottom of the multi-cyclone body, the first cyclone body and the plurality of second cyclones being communicated with each other by the inflow/outflow guide cover; and a discharge cover jointed to the lower end of the inflow/outflow guide cover so as to collect the air discharged from the plurality of second cyclones through the inflow/outflow guide cover and then so as to discharge the collected air to the outside of the multi-cyclone dust collection apparatus.

2. A multi-cyclone dust collection apparatus as claimed in claim 1, wherein the first cyclone body is formed with an air outlet at the lower end thereof and the air discharged from the air outlet is introduced into the plurality of second cyclones through the lower ends of the second cyclones.

3. A multi-cyclone dust collection apparatus as claimed in claim 2, wherein the first cyclone body comprises a first chamber outer wall defining a first cyclone chamber which causes the dirt-containing air introduced from the air inflow port to form a swirling air stream, wherein each of the plurality of second cyclones comprises a second chamber outer wall defining a second cyclone chamber, which causes the dirt-containing air introduced from the first cyclone body to form a swirling air stream, and wherein the central axis of the swirling air stream formed in the first cyclone chamber is not parallel to the central axis of the swirling air stream formed in each of the second cyclone chambers.

4. A multi-cyclone dust collection apparatus as claimed in claim 3, wherein each of the plurality of second cyclones is formed in such a way that the central axis of the swirling air stream in each of the second cyclone chambers is more spaced away from the central axis of the swirling air stream formed in the first cyclone chamber as approaching the top end of the plurality of second cyclones.

5. A multi-cyclone dust collection apparatus as claimed in claim 4, wherein the multi-cyclone body further comprises a dirt collecting chamber formed between the first chamber outer wall and the outer wall of the multi-cyclone body, and wherein the dirt collecting chamber is divided by a separating partition into a first dirt collecting chamber for collecting relatively coarse dirt separated from the air in the first cyclone body and a second dirt collecting chamber for collecting relatively fine dirt separated from the air in the plurality of second cyclones.

6. A multi-cyclone dust collection apparatus as claimed in claim 5, wherein the sealing cover is detachably joined to the top end of the multi-cyclone body, thereby cooperating with the first chamber outer wall so as to form a dirt outlet for discharging the dirt separated from the air in the first cyclone chamber into the first dirt collecting chamber, and wherein the sealing cover includes a knob on the top of the sealing cover.

7. A multi-cyclone dust collection apparatus as claimed in claim 6, wherein the sealing cover comprises a backflow prevention member, which is extended from the bottom of the sealing cover and inserted into the multi-cyclone body so as to prevent the dirt collected in the first dirt collecting chamber from flowing backward to the first cyclone chamber.

8. A multi-cyclone dust collection apparatus as claimed in claim 4, wherein the first cyclone body further comprises:

a helical guide member for guiding the air introduced through the air inflow port so that the air forms an ascending air stream in the first cyclone chamber; and an air discharging pipe mounted vertically from the lower end of the first chamber outer wall in such a manner as to be communicated with the air outlet, the air discharging pipe guiding the ascending air stream formed in the first cyclone chamber to the air outlet.

9. A multi-cyclone dust collection apparatus comprising:

a first cyclone having an inlet, through which ambient air is introduced into the first cyclone, in which the air introduced into the first cyclone is caused to swirl and ascend in the first cyclone so that dust is separated from the air; and a plurality of second cyclones arranged around the lower part of the first cyclone, in which the air discharged from the first cyclone into the plurality of second cyclones is further caused to swirl and ascend so that dust is separated from the air, each of the plurality of second cyclones having an outlet, through which the purified air is discharged from the plurality of second cyclones, wherein the inlet is provided at the bottom of the first cyclone and the air outlets, are provided at the lower ends of the second cyclones so that the ambient air is introduced into the first cyclone through the bottom of the first cyclone and then the purified air is discharged from the plurality of second cyclones through the lower ends of the plurality of second cyclones.

10. A multi-cyclone dust collection apparatus as claimed in claim 9, further comprising a dirt collecting chamber formed between the first cyclone and the plurality of second cyclones.

11. A multi-cyclone dust collection apparatus as claimed in claim 9, wherein the body of the first cyclone and the body of the plurality of second cyclones are integrally injection-molded.

* * * * *